United States Patent

[11] 3,622,599

[72] Inventors Francis J. Petracek
Agoura;
Nobuyuki Sugisaka, Canoga Park, both of Calif.
[21] Appl. No. 780,169
[22] Filed Nov. 29, 1968
[45] Patented Nov. 23, 1971
[73] Assignee Riker Laboratories, Inc.
Northridge, Calif.

[54] PROCESS FOR THE PREPARATION OF N,N-DI-LOWER ALKYL-1-PHENYL-3-PHTHALANMETHYLAMINES AND INTERMEDIATES OBTAINED IN THE SYNTHESIS
2 Claims, No Drawings

[52] U.S. Cl. .................................................. 260/346.2
[51] Int. Cl. .................................................. C07d 5/34
[50] Field of Search ...................................... 260/346.2

[56] References Cited
UNITED STATES PATENTS
3,471,519  10/1969  Klohs et al. .................. 260/346.2

OTHER REFERENCES
Wagner and Took, Synthetic Organic Chemistry (1953), pp. 546, 566 and 660

Primary Examiner—Alex Mazel
Assistant Examiner—Bernard I. Dentz
Attorneys—William T. Wise, Sebron Koster and Harold R. Beck ABSTRACT: A process for the preparation of N,N-di-lower alkyl-1-phenyl-3-phthalanmethylamines comprising the conversion of a 1-phenyl-3-phthalancarboxylic acid to its corresponding acid halide, treatment of the acid halide to form the corresponding amide and then reducing the carbonyl group of the amide substituent to yield the N,N-di-lower alkyl-1-phenyl-3-phthalanmethylamine final product and the N,N-di-lower alkyl-1-phenyl-3-phthalancarboxamide intermediate obtained in the synthesis.

PROCESS FOR THE PREPARATION OF N,N-DI-LOWER ALKYL-1-PHENYL-3-PHTHALANMETHYLAMINES AND INTERMEDIATES OBTAINED IN THE SYNTHESIS

This invention relates to a process for the preparation of compounds classified in the art of chemistry as substituted phthalans and to intermediates obtained in the synthesis.

The invention sought to be patented, in its process aspect, is described as residing in the concept of treatment of 1-phenyl-3-phthalancarboxylic acid with thionyl chloride, treating the so-produced acid chloride with a di-lower alkylamine and treating the resulting amide with lithium aluminum hydride to form a 1-phenylphthalan in which the 3-position bears a di-lower alkylaminomethyl radical.

The invention sought to be patented, in its product composition aspect, is described as residing in the concept of a chemical compound having a molecular structure in which there is attached to the 3-position of a 1-phenylphthalan nucleus an N,N-di-lower alkylcarboxamide radical.

As used throughout this application, the term "lower alkyl" embraces both straight and branched chain alkyl radicals containing one to six carbon atoms, for example, but without limitation, methyl, ethyl, n-propyl, isopropyl, n-butyl, tert-butyl, n-amyl, sec-amyl, n-hexyl, 2-ethylbutyl, 2,3-dimethylbutyl and the like.

The tangible embodiments of this invention, in its product composition aspect, possess the inherent applied use characteristics of being useful and valuable as intermediates in the production of chemical compounds that possess significant pharmacological activity. Their use in the practice of the present invention, in its process aspect, results in the preparation of N,N-di-lower alkyl-1-phenyl-3-phthalanmethylamine final products that possess valuable pharmacological activity in reducing the secretion of gastric acid, such final products being disclosed and claimed in copending application Ser. No. 701,132 now U.S. Pat. No. 3,471,519 entitled "Substituted Phthalans and Intermediates."

The manner and process of carrying out and using the invention will now be generally described so as to enable a person skilled in the art of chemistry to make and use the same as follows:

The preparation of N,N-di-lower alkyl-1-phenyl-3-phthalanmethylamines according to the present invention is illustrated by the following reaction sequence.

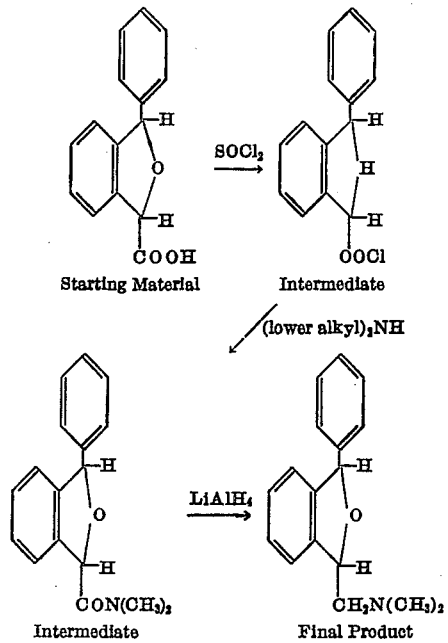

1-phenyl-3-phthalancarboxylic acid starting material in the above reaction sequence is described and claimed, together with intermediates obtained in its synthesis, in our application entitled "1-phenyl-3-Phthalancarboxylic Acid and Intermediates," filed concurrently herewith S. N. 7,80168. It is conveniently prepared by treatment of o-benzoylphenylacetic acid with sodium borohydride to yield the 1-phenyl-3H-2-benzopyran-3-one intermediate which is in turn brominated for form the 4-bromo-1-phenyl-3H-2-benzopyran-3-one intermediate. The brominated intermediate is then treated with hydrochloric acid followed by treatment with base to give the 1-phenyl-3-phenylcarboxylic acid final product that is used in the above-described process as the starting material.

In carrying out the first step of the process according to the present invention, as illustrated in the above reaction sequence, the 1-phenyl-3-phthalancarboxylic acid starting material is converted to the acid halide with halide with thionyl chloride at between 0 C. and 100 C. and in the presence of an inert organic solvent such as, for example, methylene chloride, benzene and the like. If desired, other acid halide forming agents may be used in place of the specific thionyl chloride shown in the above-depicted reaction sequence, such as, for example, thionyl bromide, phosphorus pentachloride, phosphorus pentabromide, phosphorus oxychloride and the like. Such other acid halide forming agents are the full equivalents of the specific thionyl chloride shown and their use is included within the scope of the present invention.

The acid halide, thus formed, is then treated with a di-lower alkylamine such as, for example, diethylamine or dimethylamine, in the presence of an inert organic solvent, to form an N,N-di-lower alkyl-1-phenyl-3-phthalancarboxamide.

While in the above-described reaction sequence the preparation of the specifically N,N-di-lower alkyl substituted 1-phenyl-3-phthalancarboxamides is depicted, the process according to the present invention can also be used to prepare 1-phenyl-3-phthalancarboxamides wherein the nitrogen atom of the amide function is either unsubstituted or bears only one lower-alkyl substituent. In such cases substitution on the nitrogen atom of the amide function of the 1-phenyl-3-phthalancarboxamide intermediate and on the amine function in the 1-phenyl-phthalanmethylamine final product will depend upon the nature of the amine used in the preparation of the carboxamide intermediate. Thus, where mono-substitution of the amide and amine function is desired, a mono-lower alkylamine such as, for example, methylamine, ethylamine, propylamine, isopropylamine, and the like will be used, and where it is desired that the nitrogen atom of the amide and amine functions be unsubstituted, ammonia us used. The use of ammonia or a mono-lower alkylamine is carrying out the above-reaction sequence is fully equivalent to the use of the specific di-lower alkylamines referred to above, and such use is included within the scope of the process according to the present invention. The product of the reaction is recovered by conventional techniques of isolation and crystallization. The N,N-di-lower alkyl-1-phenyl-3-phthalancarboxamide formed as described above is then converted to the N,N-di-lower alkyl-1-phenyl-3-phthalanmethylamine final product by reduction with lithium aluminum hydride, in the presence of an inert organic solvent such as, for example, tetrahydrofuran. Other amide reducing agents such as, for example, diborane may also be used in carrying out the process according to the present invention. Such amide reducing agents are the full equivalents of the specific lithium aluminum hydride reducing agent described in the above depicted reaction sequence and their use is included within the scope of the present invention.

The reaction is carried out at the reflux temperature of the solvent used and the N,N-di-lower alkyl-1-phenyl-3-phthalanmethylamine product is recovered by conventional techniques of isolation and crystallization.

In carrying out the process according to the present invention, as shown in the above-described reaction sequence, 1-phenyl-3-phthalancarboxylic acid starting materials may also be employed wherein the benzenoid portion of the phthalan nucleus and/or the phenyl substituent, may be optionally substituted by one or more lower alkyl, lower alkoxy, halo or trifluoromethyl substituents. Such optionally substituted starting materials, are prepared by the same procedure described in our application S. N. 780168 entitled "1-Phenyl-3-Phthanlancarboxylic Acid and Intermediates," and their use is fully equivalent to the use of the specific 1-phenyl-3-phthalancarboxylic acid starting material depicted in the above reaction sequence and the use is included within the scope of this invention. The use of such starting materials also results in the preparation of 1-phenyl-3-phthalancarboxamides bearing similar substitution, and such substituted 1-phenyl-3-phthalancarboxamides are the full equivalents of their unsubstituted counterparts, have the same use in the practice of this invention, and are included with the scope.

The best mode contemplated by the inventor of carrying out this invention will now be set forth as follows:

EXAMPLE a. N,N-Dimethyl-1-phenyl-3-phthalancarboxamide:

Crude 1-phenyl-3-phthalancarboxylic acid (6.8 g., 0.028 mole) was converted to the acid chloride by refluxing with thionyl chloride (10 ml.) in methylene chloride (150 ml.), and the crude acid chloride thus obtained was converted to the dimethyl amide by addition of a chloroform solution (100 ml.) at 0° C. of triethylamine (15 ml.) and dimethylamine (7 ml.).

The product, m.p. 99°–104° C., crystallized from ether/petroleum ether.
Analysis:
Calculated for $C_{17}H_{17}O_2N$:
C, 76.38; H, 6.41; N, 5.24
Found:
C, 76.12; H, 6.34; N, 5.15 b. N,N-Dimethyl-1-phenyl-3-phthalanmethylamine:

A sample of the crude amide (6.5 g.) was reduced by adding a solution of the amide in tetrahydrofuran (100 ml.) to lithium aluminum hydride (2 g.) in ether (200 ml.). The mixture was refluxed for 3 hours. The crystalline product was then obtained in the form of its hydrochloride salt, m.p. 237°–239° C.

The subject matter which the applicants regards as their invention is particularly pointed out and distinctly claimed as follows:

1. N,N-Di-lower alkyl-1-phenyl-3-phthalancarboxamide.
2. N,N-Dimethyl-1-phenyl-3-phthalancarboxamide.

* * * * *